Figure 1:
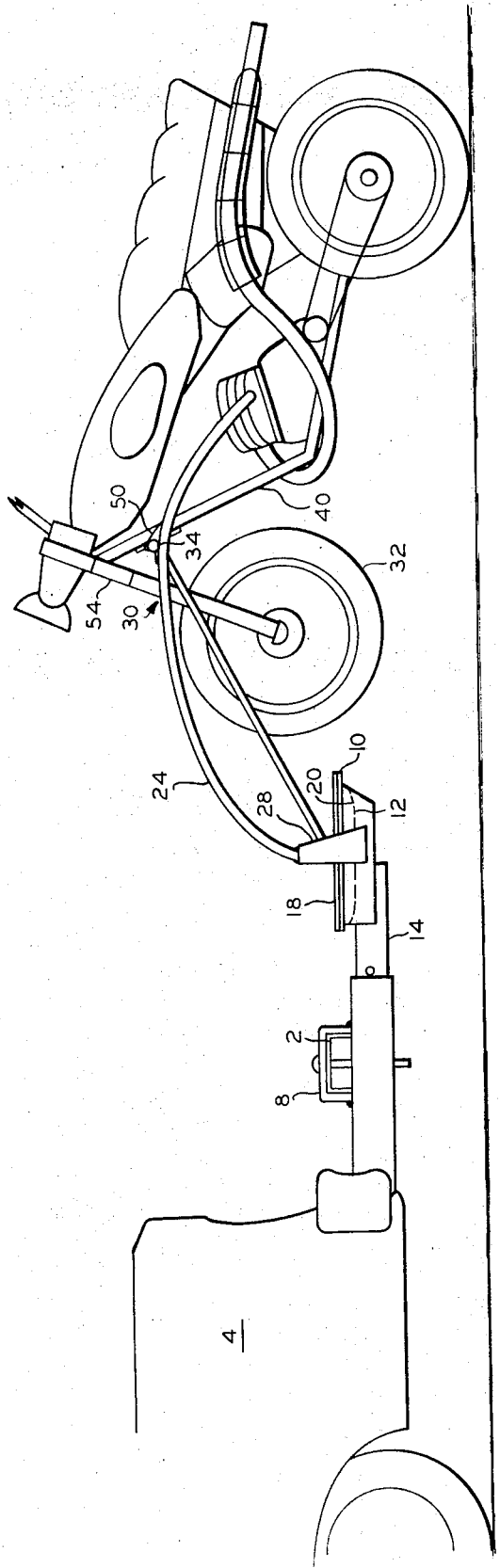

United States Patent [19]
Ortman et al.

[11] 3,764,163

[45] Oct. 9, 1973

[54] MOTORCYCLE TOWING APPARATUS

[76] Inventors: Gaylord Ortman; Kenneth J. Vanderford, both of c/o Frank L. Hart, 1206 May Ln., Bartlesville, Okla. 74003

[22] Filed: Jan. 3, 1972

[21] Appl. No.: 214,759

[52] U.S. Cl. .............................. 280/292, 280/402
[51] Int. Cl. ..................... B62d 53/04, B60p 3/06
[58] Field of Search ............................ 280/402, 292

[56] References Cited
UNITED STATES PATENTS

| | | | |
|---|---|---|---|
| 1,954,361 | 4/1934 | Lewter | 280/292 |
| 2,436,485 | 2/1948 | Roxy | 280/402 |
| 2,789,832 | 4/1957 | Zumwalt | 280/402 X |
| 2,988,382 | 6/1961 | Holland | 280/402 X |
| 3,428,332 | 2/1969 | McCance | 280/402 X |
| 3,430,983 | 3/1969 | Jones | 280/402 |
| 3,615,105 | 10/1971 | Harris | 280/402 X |

FOREIGN PATENTS OR APPLICATIONS

| | | | |
|---|---|---|---|
| 1,118,396 | 3/1956 | France | 280/292 |
| 904,744 | 2/1954 | Germany | 280/292 |

*Primary Examiner*—Leo Friaglia
*Attorney*—Frank L. Hart

[57] ABSTRACT

A motorcycle towing apparatus has one or more receiving elements slidably, removably mounted on a draw bar attached to and extending across the width of a towing vehicle. First and second frames extend upwardly and outwardly from the draw bar. The frames are attached at one end to a horizontally pivotal bearing plate and vertically pivotally connected at the other end to an elongated connecting element. The connecting element is connected to the forward frame element of the motorcycle at a location spaced a distance from the fork pivot housing of the motorcycle in the range of about 1 to about 8 inches.

10 Claims, 5 Drawing Figures

PATENTED OCT 9 1973

3,764,163

SHEET 1 OF 3

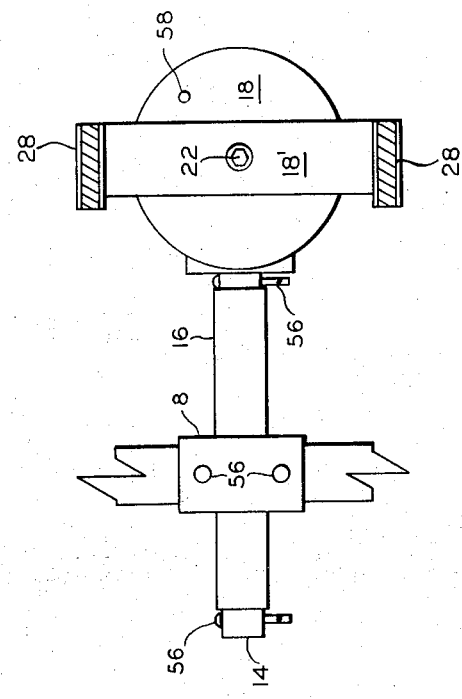
FIG. 3
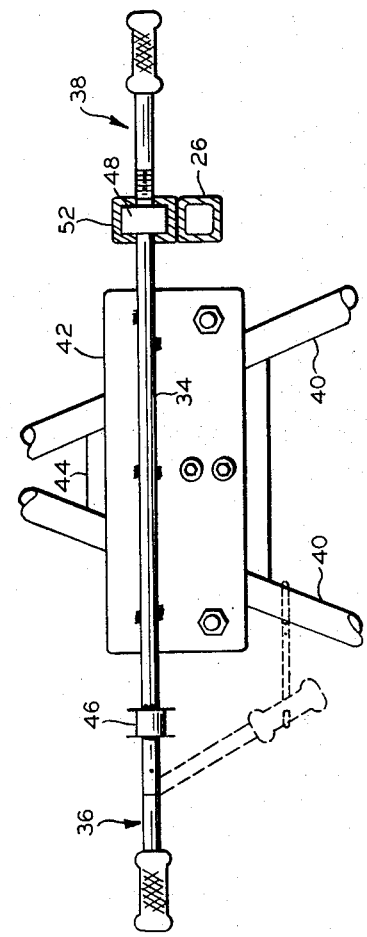
FIG. 4
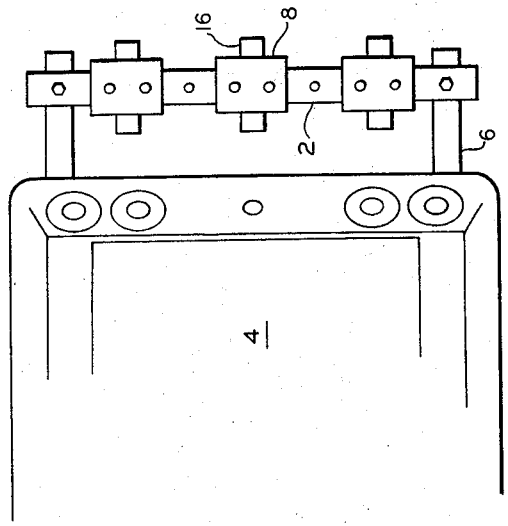

MOTORCYCLE TOWING APPARATUS

In heretofore utilized motorcycle towing devices, the tow frames were often connected to the front axle or to the motorcycle fork elements which often caused damage to the steering assembly owing to the heavy impacts placed thereon and the fact that this assembly was not constructed for withstanding these impacts. Other towing devices were constructed to cradle the front wheel while towing the rear motorcycle wheel. These devices functioned less than desirably owing to the facts stated above and additionally to the fact that the connection points of the cycle to the tow apparatus were located too low relative to the cycle's center of gravity, thereby causing the cycle to be unstable and highly likely to be turned over upon negotiating rough roads or sharp turns. Also, by elevating front cycle wheel, the cycle fork angle is increased and in turning the cycle is at a very sharp angle, causing stress on the attachments. Devices were developed which trailed both cycle wheels in contact with the road, but such devices also placed excessive stress on the front steering assembly when uneven road surfaces were contacted.

It is therefore desirable to provide a motorcycle towing device which supports the front wheel free from contact, is not connected to the front wheel, cycle forks, or other steering assembly, is connected to the cycle at a stable position relative to the cycle's center of gravity, is pivotally movable in both horizontal and vertical planes and is adopted to receive a plurality of cycles in an easily removable manner.

This invention therefore resides in a motorcycle towing apparatus having one or more receiving elements slidably, removably mounted on a draw bar extending across the width of a towing vehicle. First and second frames extend upwardly and outwardly from the draw bar. The frames are attached at one end to a horizontally pivotal bearing plate and vertically pivotally connected at the other end to an elongated connecting element. The connecting element is connected to the forward frame element of the motorcycle at a location spaced a distance from the fork pivot housing of the motorcycle in the range of about 1 to about 8 inches.

Other aspects, objects, and advantages of the present invention will become apparent from a study of the disclosure, the appended claims, and the drawings.

The drawings are diagrammatic views of the apparatus of this invention.

Figure 2:
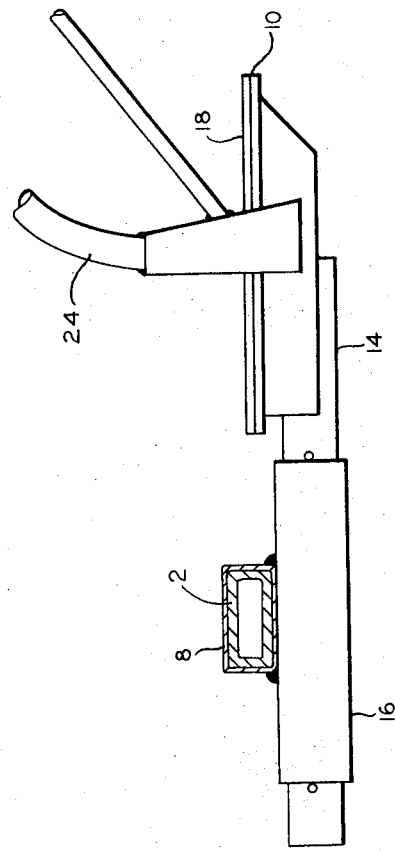
Figure 5:
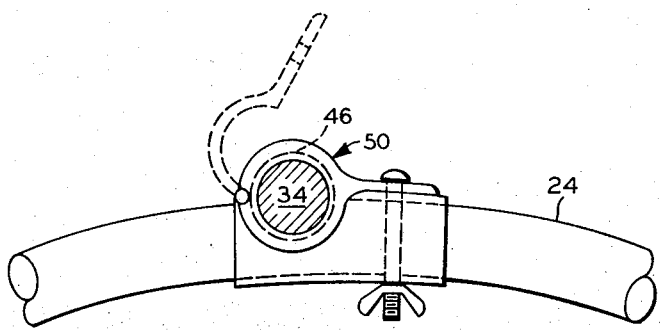

FIG. 1 shows a side view of the apparatus attached to a towing vehicle and a motorcycle, FIG. 2 shows a side view of a portion of the apparatus, FIG. 3 shows a top view of a portion of the apparatus, FIG. 4 shows a frontal view of the apparatus connecting means mounted on the forward frame elements of the motorcycle and, FIG. 5 shows a side view of the pivot housing of FIG. 4.

It should be understood that by use of the term "forward frame element of the motorcycle" it is meant the frame member or members immediately rearward of the front wheel of the motorcycle and which is attached to the fork pivot housing at one end and extends downwardly therefrom and upon the rearward portion of which the cycle engine is mounted.

Referring to FIGS. 1 and 3, a draw bar 2 is removably connected to a towing vehicle 4 by connecting members 6. The bar 2 is attached in a manner such that the draw bar 2 is maintained in an attitude spaced from the towing vehicle and extending across the vehicle at a preselected elevation preferably about that elevation of from the lower portion of the vehicle body to about the lower edge of the vehicle's bumper. At lower elevations the bar will drag on the earth's surface when negotiating rough uneven terrain, and at greater elevations the cycle will be less stable and will require the operator to lift the cycle unnecessarily high during mounting thereon.

The construction of the connection members 6 will depend upon the type of vehicle upon which mounted and can be easily constructed by one skilled in the art.

At least one receiving element 8, preferably a plurality of elements 8, are slidably, removably mounted on the draw bar 2.

The elements 8 preferably being tubular have an opening and surround the bar 2 as better seen in FIG. 2. The element, however, can have means for slidably mounting the elements 8 through a slot formed in the bar (not shown).

A first bearing plate 10 having a bearing surface 12 is attached to one of the receiving elements 8. The first plate 10 can be fixedly attached to the receiving plate 8; however, it is preferred that the plate 10 be attached to an outwardly extending member 14 that is removably positioned in a member housing 16 which is fixedly attached to an upper or lower surface of the receiving element 8. By the preferred construction, the bearing plate 10 and hereafter described frame members can be easily removed when the apparatus is not in use.

A second bearing plate 18 has a bearing surface 20 rotatably mounted in contact with the bearing surface 12 of the first bearing plate 10 for rotation of said second bearing plate 18 in a generally horizontal plane. The bearing surfaces 12, 20 can be planar. Preferably, one of the bearing surfaces is of a concave configuration and the other bearing surface is of a convex configuration and of dimensions sufficient for nesting within and in contact with the concave bearing surface. In the preferred construction, the bearing surfaces can absorb a portion of the loading imparted by the towed cycle thereby reducing the wear of the pivot pin 22 connecting the plates and providing larger bearing surfaces per unit area.

First and second frames 24, 26 each have first and second end portions 28, 30 and are attached at their first end portion 28 to opposed sides of the second bearing plate 18 via rectangular plate 18' for example. The first and second frames 24, 26 each extend upwardly and outwardly therefrom with said frames 24, 26 spaced one from the other. The space between said frames 28, 30 is larger than the front wheel 32 and/or fender (not shown) of the motorcycle for supporting the cycle without contacting said wheel 32.

Referring to FIG. 4, an elongated connecting element 34 has first and second end portions 36, 38 and is connected to the motorcycle forward frame element or elements 40 and extends preselected horizontal distances outwardly therefrom with the first and second end portions 36, 38 on opposed sides of the forward frame element 40. The connecting element 34 can be welded to the forward frame elements 40 or more preferably be removably attached thereto with for example first and second sandwich plates 42, 44, as known in the art.

First and second pivoting elements 46, 48 are each coaxially positioned about the connecting element 34 at locations spaced from the forward frame element 40 on opposed sides thereof. The pivoting elements 46, 48 can be for example ball bearings, wear rings having outwardly extending flanges on its ends, and others as known in the art.

First and second pivot housings 50, 52 are each attached to the second end portion 30 of respective first and second frames 24, 26 and are of a construction for receiving, mating with and pivotally, removably maintaining a respective pivoting element 46, 48.

Referring to FIG. 1, the connecting element 34 is positioned relative to the motorcycle for connecting the second end portions 30 of the first and second frames. 24, 26 to the forward frame element 40 at a location spaced along said forward frame element 40 from the fork pivot housing 54 a distance in the range of about 1 to about 8 inches.

It has been found that if the pivotal connection is made closer than 1 inch to the fork pivot housing 54 or further from said housing than 8 inches, that the center of gravity of the motorcycle will be respectively too remote or too near the connection location to easily maintain the motorcycle in a self-balancing attitude while being towed over rough terrain while maintaining the connecting apparatus free from excessive impact forces. Pivotally connecting the motorcycle to the towing vehicle at locations other than the above range are undesirable and may cause damage to the motorcycle and/or the towing apparatus. A motorcycle being undesirably maintained may also cause the towing vehicle to be thrown out of control.

In the preferred connecting means, first and second ball bearings are each fixedly attached to the connecting element 34 at a location between the forward frame element 40 and respective first and second connecting element end portions 36, 38.

End portions 36, 38 can be utilized for lifting the motorcycle into pivotal connection with frames 24, 26 and as supplementary foot rests during riding of the motorcycle. It is also preferred that the first and second end portions 36, 38 be removably connected to the connection element 34 where it is desired to utilize said end portions only during mounting of the cycle on the towing apparatus or pivotally connected to the connecting means for movement to a position along the forward frame element, thereby maintaining the end portions with the connecting element 34 at all times, yet allowing them to be folded into a position whereby they do not protrude beyond the side outlines of the cycle. A catch can be provided on the forward frame element 40 for maintaining said end portions 36, 38 in a folded position.

Referring to FIG. 3, it is preferred that the draw bar 2 have a plurality of openings formed along its length matable with openings formed through the retaining element 8. Lock pins 56 can then be placed through the draw bar 2 and receiving element 8 for maintaining the receiving element and associated elements at a preselected position behind the towing vehicle. As can be seen, a plurality of the receiving elements and associated bearing elements, frames and connecting means can be positioned on a single draw bar 2 for towing a plurality of motorcycles behind a single towing vehicle.

It is also preferred that the first and second frames 24, 26 be of dimensions and be angularly disposed relative to the second bearing plate 18 for maintaining the motorcycle front wheel at a location spaced from a surface, over which the motocycle is to be towed, a distance in the range of about 12 to about 18 inches. At less than about 12 inches, the wheel and supporting apparatus will frequently hit the ground when being towed over rough terrain with resultant damage to the tow apparatus or the cycle. At greater than about 18 inches the center of gravity of the cycle is moved too far upwardly causing the cycle to be unstably maintained as described above. The frames 24, 26 can be pivotally connected to the plate 18 and be adjustable for maintaining the motorcycle front wheels at the preselected distance.

Matable openings 58 can also be formed through the bearing plates 10, 18 and aligned relative to the frames for receiving a lock pin 56 for maintaining the plates against pivotal movement. This is particularly useful where the towed motorcycle is to be backed up and during loading and unloading of the cycle.

In the use of the apparatus, the draw bar 2 is generally maintained on the towing vehicle as may one or more receiving elements 8. The member 14 is inserted into the member housing 16 and there locked with pin 56. The first and second end portions 36, 38 of the connecting element 34 are grasped and lifted by the operator and the pivoting elements 46, 48 are positioned in their respective housings 50, 52 and there secured (better seen in FIG. 5).

After the motorcycle has been towed to a desired location, the pivot housings 50, 52 are released and the motorcycle is lifted and removed from the towing apparatus and is ready to be utilized.

It can also be seen in FIG. 1 that if the second end portion 30 of the frames 24, 26 are downwardly inclined from the pivot housings, are of a sufficient length, and the pivot housings are recessed in the frames 24, 26, then a skilled rider could align the cycle connecting element 34 with the frames 24, 26 and by giving the cycle proper power could ride the cycle into the mounted position on the towing apparatus with the pivoting elements 46, 48 positioned in the pivot housings 50, 52.

Other modifications and alterations of this invention will become apparent to those skilled in the art from the foregoing discussion and accompanying drawing, and it should be understood that this invention is not to be unduly limited thereto.

What is claimed is:

1. In a device for towing a motorcycle having a forward frame element, a fork pivot housing, and a front wheel behind a towing vehicle, the combination comprising:
   a draw bar;
   means for removably attaching the draw bar to the towing vehicle and maintaining said draw bar in an attitude spaced from the towing vehicle and extending across the width of the vehicle at a preselected elevation;
   at least one receiving element, said element being slidably, removably mounted on the draw bar;
   a first bearing plate having a bearing surface and being attached to the receiving element;
   a second bearing plate having a bearing surface rotatably mounted in contact with the bearing surface of the first bearing plate for rotation of said second bearing plate in a generally horizontal plane;

first and second frames each having first and second end portions, being attached at their first end portions to opposed sides of the second bearing plate, and extending upwardly and outwardly therefrom with said frames spaced one from the other; and connecting means for pivotally, removably connecting the second end portions of the first and second frames to the forward frame element of the motorcycle at a location spaced along said forward frame element from the fork pivot housing a distance in the range of about 1 to about 8 inches for generally vertical, pivotal movement of the motorcycle between the first and second frames and maintaining the front wheel of the motorcycle elevated, spaced from the apparatus and the vehicle and the near wheel in rollable contact with the surface over which the motorcycle is being towed.

2. An apparatus, as set forth in claim 1, wherein the draw bar has a plurality of openings formed along its length; and including means for locking the receiving element to the draw bar at a preselected location along the length of said draw bar.

3. An apparatus, as set forth in claim 1, wherein the connecting means comprises:

an elongated connecting element having first and second end portions, being connected to the motorcycle forward frame element and extending preselected horizontal distances outwardly therefrom;

first and second pivoting elements each coaxially positioned about the connecting element at locations spaced from the forward frame element on opposed sides thereof; and first and second pivot housings each attached to the second end portion of respective first and second frames and being of a construction for receiving a respective pivoting element and removably maintaining said element.

4. An apparatus, as set forth in claim 3, wherein said pivoting elements are first and second ball bearings each fixedly attached to the connecting element at a location between the forward frame element and respective first and second connecting element end portions.

5. An apparatus, as set forth in claim 3, wherein the connecting element is removably connected to the forward frame element of the motorcycle.

6. An apparatus, as set forth in claim 3, wherein the first and second end portions of the connecting element are removably connected to said connecting element.

7. An apparatus, as set forth in claim 3, wherein the first and second end portions of the connecting element are each pivotally connected to the connecting element for movement to a position along the forward frame element.

8. An apparatus, as set forth in claim 1, wherein one of the bearing surfaces is of a concave configuration and the other bearing surface is of convex configuration and of dimensions sufficient for nesting within and in contact with the concave bearing surface.

9. An apparatus, as set forth in claim 1, wherein the first and second frames are of dimensions and are angularly disposed relative to the second bearing plate for maintaining the motorcycle front wheel at a location spaced from a surface over which the motorcycle is to be towed a distance in the range of about 12 to about 18 inches.

10. An apparatus, as set forth in claim 1, wherein there are a plurality of receiving elements maintained on the draw bar, each element having associated bearing elements, frames and connecting means for towing a plurality of motorcycles behind a towing vehicle.

* * * * *